United States Patent [19]

Highsmith et al.

[11] Patent Number: 5,008,319
[45] Date of Patent: Apr. 16, 1991

[54] HOMOGENEOUS MIXTURES OF SOLID ORGANIC ACIDS AND SOLID CATIONIC ESTER-BASED POLYMER FLOCCULANTS

[75] Inventors: Ronald E. Highsmith, Skaneateles; Eric H. Larson, Marcellus, both of N.Y.

[73] Assignee: Polypure, Inc., Solvay, N.Y.

[21] Appl. No.: 473,351

[22] Filed: Feb. 1, 1990

[51] Int. Cl.$^5$ .............................................. C08K 5/09
[52] U.S. Cl. ...................................... 524/321; 526/216
[58] Field of Search ................. 524/521; 526/216, 307

[56] References Cited

U.S. PATENT DOCUMENTS 4,668,747  5/1987  Cadel et al. ........................... 526/216

Primary Examiner—Joseph L. Schofer
Assistant Examiner—Jeffrey T. Smith
Attorney, Agent, or Firm—Robert M. Phipps

[57] ABSTRACT

Homogeneous compositions of a solid, water soluble organic acid, e.g., glutaric acid, and a solid cationic ester-based copolymer flocculant are resistant to mechanical segregation and stratification caused by agitation. The compositions are prepared by coating the polymeric flocculant with the organic acid. The compositions are useful in sludge dewatering, water treatment, paper processing and waste water treatment.

8 Claims, No Drawings

HOMOGENEOUS MIXTURES OF SOLID ORGANIC ACIDS AND SOLID CATIONIC ESTER-BASED POLYMER FLOCCULANTS

BACKGROUND

1. Field of the Invention

This invention relates to the preparation and use of homogeneous mixtures of solid organic acids with solid cationic ester-based polymer flocculants.

2. Description of the Prior Art

Cationic polymer flocculants are used for sludge dewatering, in water treatment, in wastewater treatment, and for many industrial processes such as paper making. Cationic polymer flocculants are first dissolved in water to form a dilute solution and then the solution is mixed with the sludge or water to be treated. In most uses, the polymer flocculant causes flocculation of suspended solids which are concentrated and separated from the water by mechanical means. In laboratory tests, the drainage rate of the water through the suspended solids held on a filter is commonly used to measure the relative efficiency of polymer flocculants. Faster drainage rates and lower filter resistance result from the use of more efficient polymers.

It can be shown in some instances that the performance of the cationic ester-based polymer flocculants can be improved by addition of acid to the polymer solution. The resulting improvement has been attributed to reduction in hydrolysis of the ester linkage (for instance, see Cadel and Larson, U.S. Pat. No. 4,668,747), or other reactions not yet understood.

Avoiding fine particles in dry polymer flocculants is also important because the dust is troublesome to workers. Also, the fine particles produced by the manufacturing process often represent a yield loss. It would be an added benefit if a process could add an acid which also reduces the fines present in the dry product.

It is a troublesome matter to add acid to a solution of polymer in a separate step. It is advantageous if the acid can be included with the solid cationic polymer. A simple mixture of solid acid with solid cationic polymer is not optimum because the density and or particle size of common solid acids is significantly different than that of the solid cationic polymer and consequently, separation of the two can occur during shipping and handling. When solutions of non-homogeneous mixtures of acid and polymer are made, the result can be an excess of acid in one solution and a deficiency in another. This obviously will lead to unacceptable variations in product performance.

It is an object of this invention to provide a composition or mixture of solid organic acid and solid cationic polymeric flocculant which is homogeneous and does not separate under normal use and material handling conditions.

Other advantages of the present invention will become apparent to those skilled in the art from the following description, examples and appended claims.

SUMMARY OF THE INVENTION

In accordance with this invention there is provided a homogeneous composition of a solid organic acid and a solid cationic ester-based polymeric flocculant which is a copolymer of acrylamide and cationic monomer, the polymeric flocculant particles being coated by the acid, the mixture being resistant to mechanical segregation or stratification due to agitation.

DESCRIPTION OF THE PREFERRED EMBODIMENTS

The organic acid employed in this invention is a solid yet water soluble at room temperature. The preferred acid is glutaric acid, whose formula is:

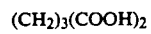

$(CH_2)_3(COOH)_2$  I

Other useful acids may exist, however experiments under limited laboratory conditions with adipic and succinic acids surprisingly showed they inhibited the performance of the cationic flocculant instead of enhancing it, as will be shown in the examples which follow.

The solid cationic ester-based polymer flocculants of this invention are copolymers of acrylamide and a monomer of the formula.

$CH_2=C(D)C(O)EN(CH_3)_3{}^+ X^-$  II wherein

D is selected from the group consisting of H and —$CH_3$;

E is selected from the group consisting of —$(CH_2)_2$—, —$(CH_2)_3$—, —CHOH—$CH_2$—$CH_2$— and —$CH_2$—CHOH—$CH_2$—; and X is selected from the group consisting of Cl, Br and $CH_3SO_4$.

Illustrative of the monomers of Formula II are 1-trimethylammonium-2-hydroxypropylmethacrylate methylsulfate, trimethylammonium-2-hydroxypropylacrylate methylsulfate, 1-trimethylammonium-2-2-hydroxypropylacrylate methylsulfate, dimethylaminoethylmethacrylate methylchloride quat, and the like. The polymeric flocculants of this invention are ester-based, and chemically and thermally stable at the temperatures employed in the process of this invention. These flocculants and their preparation are well known in the art, the details of which are readily available.

A wide range of ratios of acid and flocculant in the invented mixture may be employed. Generally, it has been found that less than 20 percent but not less than 1 percent by weight of the acid in the acid/flocculant polymer mixture will be sufficient to produce the desired improvement in flocculant performance. Particularly useful are compositions containing from 10 to 2 weight percent of organic acid and 90 to 98 weight percent of polymeric flocculant.

The process of producing a homogeneous mixture is best achieved by coating the surface of the polymer particles with the acid. The acid has an affinity for the surface of the polymer and yet, rapidly dissolves away when placed in water, allowing the polymer to dissolve. This process has the added advantage of binding together undesirable fines and dust particles to produce more uniform-sized particles.

The process of producing a homogeneous mixture may be achieved by coating the polymer particles with acid by any of several known techniques such as mixing the flocculant particles with molten acid or coating a concentrated solution of the acid on the copolymer particles and drying. Particular details of these processes may be found by reference to any standard chemical engineering reference, see for instance "Encyclopedia of Chemical Engineering", John Wiley and Sons, New York, ISBN 0-471-02037-0.

The present copolymers are useful for viscosity modifiers, coagulation, flocculation or sedimentation of suspended solids. Industries where such uses are important include process water preparation or waste water treatment. Such polymers are used in the paper industry for paper processing in applications such as retention aids, paper size and coating modifiers, and wet and dry strength modifiers. Other applications include yarn lubricants, antistatic coatings, personal care products, including shampoos and soaps, industrial cleaners, biocides, adhesives, friction reducers, emulsion and reverse emulsion breakers, flotation aids, mineral processing aids, production of electrically conductive paper, steric stabilizers and surfactants and filtration enhancement.

The present acid/copolymer compositions are particularly useful as flocculants. Flocculants are added to suspensions having finely divided solids; the flocculants cause the individual particles to aggregate. This reduces the holding time in settling tanks before decantation of the liquid is performed and therefore smaller tanks may be used. Sludge dewatering is also improved by using such flocculants.

The present invention is more fully illustrated by the following non-limiting examples in which, unless otherwise specified, all temperatures are expressed as degrees Celsius and all parts are parts by weight.

EXAMPLE 1

Twenty-five grams of a dry polymer consisting of 75 mole percent acrylamide and 25 mole percent of the methylchloride salt of dimethylaminoethylacrylate was placed in each of three glass containers. Then 2.8 grams of adipic acid are placed in the first container, 2.8 grams of succinic acid in the second, and 2.8 grams of glutaric acid in the third container. The contents of each container is thoroughly mixed. The containers are then placed in an oven maintained at 105° C. for a total of 45 minutes. The samples are mixed periodically while in the oven. The sample containing glutaric acid is white and quite homogeneous upon cooling. The samples containing adipic and succinic acid are not homogeneous and are returned to the oven for another 45 minutes at 160° C. with periodic mixing. Offensive fumes and smoke are given off by these samples. These samples are now homogeneous, but their color has changed from white to cream.

Sieve analysis of any particulate sample requires vigorous agitation of the particles, see for example the various American Society for Testing Material test procedures. The acid treated polymeric flocculants prepared above plus an equal amount of the untreated copolymer are separately placed on a 100 mesh sieve and vigorously shaken for a standard period of time. The sieve results are tabulated in Table I below. Sieve analysis shows the glutaric acid treated sample has less fines than the other samples. On inspection, the coated polymeric particles exhibited no breakage in the substantially uniform acid coating.

It is important to avoid fine particles, particularly those of less than 100 mesh in size, in the preparation and handling of dry polymer products primarily to reduce worker exposure to dust. In the commercial production of dry polymer flocculants, all material passing the 100 mesh screen is often rejected and represents a yield loss for the process. In this experiment the acids reduced the amount of material passing the 100 mesh screen, thereby giving higher yields to the overall process of manufacture of dry polymers.

TABLE I

| Sample | Sieve Analysis Percent Passing 100 Mesh |
|---|---|
| untreated polymer flocculant | 1.94% |
| glutaric/flocculant mixture | 0.06 |
| succinic/flocculant mixture | 0.18 |
| adipic/flocculant mixture | 0.12 |

Performance of the untreated starting polymeric flocculant and the three mixtures prepared above are compared using a dewatering test on municipal anaerobic digested sludge from the Metropolitan Syracuse, N.Y. Wastewater Treatment Plant. A detailed description of the dewatering test is found in U.S. Pat. No. 4,668,747. At the point of equivalent performance (specific filter resistance of about $1 \times 10^{-8}$ sec $^2$/gm) 140 parts of the glutaric acid mixture gave the same performance as 190 parts of the original untreated polymer flocculant, a performance benefit of 26% for the mixture. Since the mixture is 90 percent polymer, the overall improvement is a 29% better performance for the polymeric flocculant. The succinic and adipic mixtures do not dissolve completely and fail to give any significant sludge dewatering action.

The foregoing examples and methods have been described in the foregoing specifications for the purpose of illustration and not limitation. Many other modifications and ramifications will naturally suggest themselves to those skilled in the art based on this disclosure. These are intended to be comprehended as within the scope of this invention.

The embodiments of the invention in which an exclusive property or privilege is claimed are defined as follows:

1. A homogeneous composition of a solid, water soluble organic acid and a solid cationic ester-based polymeric flocculant which is a copolymer of acrylamide and a cationic monomer, said mixture having fewer fine particles than the solid polymer flocculant particles prior to incorporation into said composition, said polymeric flocculant particles being coated by said acid, thereby said mixture being resistant to mechanical segregation or stratification.

2. The composition of claim 1 wherein said acid is glutaric acid and said cationic monomer is of the formula:

$$CH_2=C(D)C(O)EN(CH_3)_3^+ \; X^-$$

wherein

D is selected from the group consisting of H and $CH_3$;

E is selected from the group consisting of —$(CH_2)_2$—, —$(CH_2)_3$—, —CHOH—$CH_2$—$CH_2$— and —$CH_2$—CHOH—$CH_2$—; and X is selected from the group consisting of Cl, Br and $CH_3SO_4$.

3. The composition of claim 2 wherein the composition is comprised of 1 to 20 weight percent of acid and from 80 to 99 weight percent of polymeric flocculant.

4. The composition of claim 2 wherein the mixture consists of 10 to 2 weight percent acid by weight and 90 to 98 weight percent of polymeric flocculant.

5. The composition of claim 4 wherein the acid is glutaric acid.

6. The composition of claim 2 wherein the copolymer is selected from the group consisting of copolymers of acrylamide and methacryloyloxyhydroxyalkyl ammonium salts and copolymers of acrylamide and methacrylamidohydroxy ammonium salts.

7. The composition of claim 1 wherein the coating of acid is obtained by contacting the polymeric flocculant particles with an acid at temperatures above the melting point of the acid.

8. The composition of claim 1 wherein the coating is obtained by spray-drying a solution of the acid onto the polymeric flocculant particles.

* * * * *

Disclaimer 5,008,319 — Ronald E. Highsmith, Skaneateles; Eric H. Larson, Marcellus, both of N.Y. HOMOGENEOUS MIXTURES OF SOLID ORGANIC AND SOLID CATIONIC ESTER-BASED POLYMER FLOCCULANTS. Patent dated April 16, 1991. Disclaimer filed March 10, 1997, by the assignee, S.N.F.

Hereby enters this disclaimer to all claims of said patent.

*(Official Gazette, April 29, 1997)*